US012478509B2

(12) United States Patent
Leung

(10) Patent No.: US 12,478,509 B2
(45) Date of Patent: Nov. 25, 2025

(54) LAYERED COMPOSITE FOR SCAR TREATMENT AND PREVENTION

(71) Applicant: THE GOVERNMENT OF THE UNITED STATES AS REPRESENTED BY THE SECRETARY OF THE ARMY, Fort Detrick, MD (US)

(72) Inventor: Kai P Leung, San Antonio, TX (US)

(73) Assignee: The Government of The United States, As Represented by the Secretary of the Army, Ft. Detrick, MD (US)

( * ) Notice: Subject to any disclaimer, the term of this patent is extended or adjusted under 35 U.S.C. 154(b) by 391 days.

(21) Appl. No.: 17/588,950

(22) Filed: Jan. 31, 2022

(65) Prior Publication Data
US 2022/0226159 A1 Jul. 21, 2022

Related U.S. Application Data

(63) Continuation-in-part of application No. PCT/US2020/044251, filed on Jul. 30, 2020.
(Continued)

(51) Int. Cl.
*A61F 13/00* (2024.01)
*A61F 13/02* (2024.01)
(Continued)

(52) U.S. Cl.
CPC .... *A61F 13/00063* (2013.01); *A61F 13/0253* (2013.01); *A61F 13/0263* (2013.01); *A61K 31/4418* (2013.01)

(58) Field of Classification Search
CPC ...... A61F 13/00; A61F 13/02; A61F 13/0246; A61F 13/0253; A61F 13/0256;
(Continued)

(56) References Cited

U.S. PATENT DOCUMENTS 4,060,084 A * 11/1977 Chandrasekaran .. A61K 9/7053
604/304
4,314,557 A * 2/1982 Chandrasekaran .. A61K 9/7023
424/449
(Continued)

FOREIGN PATENT DOCUMENTS

CN 105213351 A 1/2016
EP 1682061 7/2006
(Continued)

OTHER PUBLICATIONS

Versaperm, Measuring the vapour permeability of Linear Low Density Polyethylene (LLDPE) products, Aug. 4, 2010.*
(Continued)

*Primary Examiner* — Alireza Nia
*Assistant Examiner* — Andrew Jun-Wai Mok
(74) *Attorney, Agent, or Firm* — Timothy H. Van Dyke; Wolter, Van Dyke, Davis PLLC

(57) ABSTRACT

A layered composite for scar treatment and prevention, the layered composite including a backing section; a drug matrix section; and a skin-interfacing section. The drug matrix section may be disposed between the back section and the skin-interfacing section. The drug matrix section may include pirfenidone in an amount of from about 1 to about 20 mg/cm$^2$. The layered composite may provide greater than about 75% release of the pirfenidone over a period of about 48 to 72 hours. A method for scar treatment and prevention that includes applying a layered composite as described to a burn wound.

11 Claims, 12 Drawing Sheets

Related U.S. Application Data

(60) Provisional application No. 62/880,396, filed on Jul. 30, 2019.

(51) Int. Cl.
*A61F 13/0246* (2024.01)
*A61K 31/4418* (2006.01)

(58) Field of Classification Search
CPC ............ A61F 13/0263; A61F 13/00008; A61F 13/00021; A61F 13/00063; A61F 2013/00582; A61F 2013/00089; A61K 9/7084; A61K 9/7092; A61L 26/00; A61L 26/0066; A61L 15/00; A61L 15/16; A61L 15/44; A61L 2300/00
See application file for complete search history.

(56) References Cited

U.S. PATENT DOCUMENTS

| | | | |
|---|---|---|---|
| 6,004,578 | A | 12/1999 | Lee et al. |
| 8,287,900 | B2 * | 10/2012 | Matsuzawa .......... A61K 9/7053 |
| | | | 424/443 |
| 9,579,294 | B1 | 2/2017 | Matloub |
| 9,642,697 | B2 | 5/2017 | Heo et al. |
| 10,016,584 | B1 | 7/2018 | Matloub |
| 10,188,637 | B2 | 1/2019 | Mujumdar |
| 2008/0131493 | A1 | 6/2008 | Matloub |
| 2015/0196515 | A1 * | 7/2015 | Aliyar .................... A61P 31/10 |
| | | | 156/60 |
| 2016/0228424 | A1 | 8/2016 | Armendariz Borunda et al. |
| 2018/0043005 | A1 | 2/2018 | Castado |
| 2018/0078423 | A1 | 3/2018 | Magin et al. |
| 2018/0243277 | A1 | 8/2018 | Mujumdar |
| 2020/0253944 | A1 * | 8/2020 | Magaña Castro ... A61K 31/351 |

FOREIGN PATENT DOCUMENTS

| | | | | |
|---|---|---|---|---|
| EP | 2612630 | A1 * | 7/2013 | ............. A45D 44/12 |
| EP | 3020398 | A1 | 11/2014 | |
| WO | 2005042055 | A2 | 5/2005 | |
| WO | WO-2006135479 | A2 * | 12/2006 | ............. A61L 27/54 |
| WO | 2010107794 | A2 | 9/2010 | |

OTHER PUBLICATIONS

Haibing Zhang, Ph.D., The Permeability Characteristics of Silicone Rubber, 2006.*
EP Search Report, EP20847308.2, Apr. 26, 2023, 6 pages.
Dorati, Rossella et al., "Development of a Topical 48-H Release Formulation as an Anti-scarring Treatment for Deep Partial-Thickness Burns", Springer Link, May 11, 2018, 13 pages.
Mandapalli, Praveen Kumar et al., "Effect of pirfenidone delivered using layer-by-layer thin film on excisional wound healing", European Journal of Pharmaceutical Sciences, Feb. 15, 2016, vol. 83, pp. 166-174.
Chung, Eugene P. et al., "A Soft Skin Adhesive (SSA) Patch for Extended Release of Pirfenidone in Burn Wounds", Pharmaceutics, 2023, vol. 15, No. 1842, 21 pages.
Dow Corning, Dow Corning MG 7-1010 Soft Skin Adhesive for Medical Device Applications, Healthcare Solutions, 2016, 2 pages.
Jennings, Cheryl L. et al. "Sequential release of multiple drugs from flexible drug delivery films", International Journal of Polymeric Materials and Polymeric Biomaterials, 2017, vol. 66, No. 11, pp. 569-576.
Mandapalli, Praveen Kumar et al., "Effect of pirfenidone delivered using layer-by-layer thin film on excisional wound healing", European Journal of Pharmaceutical Sciences, 2016, vol. 83, pp. 166-174.

* cited by examiner

LAYERED COMPOSITE FOR SCAR TREATMENT AND PREVENTION

STATEMENT REGARDING FEDERALLY SPONSORED RESEARCH OR DEVELOPMENT

The invention described herein may be manufactured, used and licensed by or for the United States Government.

FIELD OF THE INVENTION

The present invention relates generally to a layered composite for treatment of burn injuries. More particularly, various embodiments relate to layered pirfenidone-containing composite for scar treatment and prevention, which may be operable to release pirfenidone to the skin over time at a controlled rate, while being easily applied and removed from injured sites.

BACKGROUND

Historically, burns have comprised about 5-20% of the casualties sustained in post-World War II conflicts. Burn wounds on the battlefield are difficult to treat for various reasons. Further complicating the treatment process is the difficulty of first responders to determine what type of burn (partial-thickness, deep partial-thickness, full-thickness, etc,) a casualty has sustained. Fibroproliferative disorders of the skin resulting from burn injuries, such as hypertrophic scarring (HTS), are characterized by dysregulated collagen production and result in raised, thick, and inflexible scars. HTS occurs most commonly after burn injury, surgery, or excessive inflammation and can dramatically diminish patient quality of life. HTS contractures and rigidity can limit range of motion and impair day-to-day activities. Available anti-scarring therapies such as surgical management, vascular laser treatment, and pressure therapy, have limited efficacy on the final scar outcome. Moreover, these treatment options are not possible at the point of injury. A need exists for the ability to intervene on inflammation and burn progression early for better long-term outcomes.

Deep partial-thickness (DPT) burns frequently result in excessive scars that can lead to severe functional impairment, psychological morbidity, and costly long term healthcare. Most partial-thickness burns are not grafted. A large percentage of DPT-burn wounds will form hypertrophic scars, resulting in scar contracture and loss of function. But exactly which burns will develop into hypertrophic scarring is difficult to predict. And once formed, treatments for hypertrophic scars are only minimally effective. An incidence of hypertrophic scar of 80% has been documented in military personnel following burn injury. There are currently no effective treatment options for the prevention of burn-induced scarring.

Pirfenidone (Pf) is a small molecule with a molecular weight of 185.23 daltons whose chemical name is 5-methyl-1-phenyl-2-(1H)-pyridone. Pirfenidone possesses anti-inflammatory and anti-fibrotic properties and has been investigated for therapeutic benefits to patients suffering from various fibrotic conditions. It is approved in Japan for treatment of idiopathic pulmonary fibrosis (IPF) under the trade name PIRESPA®. It is approved in Europe and the US for treatment of IPF under the trade name ESBRIET®.

There is a pressing need for a treatment that can both prevent burn-induced scarring and provide ease of use in the field, particularly in environments, such as a battlefield, where burn care is challenging.

The discussion of shortcomings and needs existing in the field prior to the present invention is in no way an admission that such shortcomings and needs were recognized by those skilled in the art prior to the present disclosure.

BRIEF SUMMARY

Various embodiments relate to a layered composite for scar treatment and prevention, the layered composite including a backing section; a drug matrix section; and a skin-interfacing section. The drug matrix section may be disposed between the back section and the skin-interfacing section. The drug matrix section may include pirfenidone in an amount of from about 1 to about 20 mg/cm$^2$. The layered composite may provide greater than about 75% release of the pirfenidone over a period of about 48 to 72 hours.

The drug matrix section may include a plurality of particles comprising the pirfenidone and a controlled release matrix base material. The plurality of particles may have an average particle size of from about 100 nanometers to about 700 micrometers. The controlled release matrix base material may be selected from acrylic, cellulose, polyurethane, silicone, polyisobutylene, and combinations thereof. The drug matrix section may additionally or alternatively include an encapsulation agent, such as poly(lacticco-glycolic acid) (PLGA), cyclodextrin, cellulose, albumin, alginate, chitosan, and combinations thereof. The drug matrix section may additionally or alternatively include an acrylic pressure-sensitive adhesive (PSA). The drug matrix section may further include a penetration enhancer, such as cocoyl caprylocaprate, decyl oleate, dimethyl sulfoxide, oleyl alcohol, octyldodecanol, propylene glycol, isopropyl myristate, triacetin, and combinations thereof.

The backing section may include a permeable material. The permeable material may be permeable to one selected from the group consisting of moisture, gas, and combinations thereof. The permeable material may have a thickness of from about 10 to about 100 μm.

The skin-interfacing section may have a thickness of from about 100 to about 2,000 μm. The skin-interfacing section may further include a releasable liner. The releasable liner may have a thickness of from about 25 to about 150 μm.

Various embodiments relate to a method for scar treatment and prevention that includes applying a layered composite as described in any of the embodiments to a burn wound. According to various embodiments, the skin-interfacing section may further include a releasable liner and the method may further include removing the layered composite from the burn wound.

These and other features, aspects, and advantages of various embodiments will become better understood with reference to the following description, figures, and claims.

BRIEF DESCRIPTION OF THE FIGURES

Many aspects of this disclosure can be better understood with reference to the following figures.

FIG. 7 is an example according to various embodiments illustrating 24 hour cumulative permeation of Pf from multilaminate patch without and with various penetration enhancers (PE) in full thickness, intact porcine skin according to Example 8.

FIG. 8 provides a diagram illustrating a general fabrication process related to the compositional layers set forth in Table 1.

FIG. 9 illustrates another fabrication process, which is similar to the fabrication process of FIG. 8 but modified for larger scale production.

FIG. 10 shows a system for conducting the fabrication process set forth in FIG. 9.

It should be understood that the various embodiments are not limited to the examples illustrated in the figures.

DETAILED DESCRIPTION

Introduction and Definitions

Various embodiments may be understood more readily by reference to the following detailed description. Unless defined otherwise, all technical and scientific terms used herein have the same meaning as commonly understood by one of ordinary skill in the art to which this disclosure belongs.

As used herein, the term "composite" refers to a structure, thing, or object made up of several parts or elements.

As used herein, the term "layered" refers to a characteristic of a structure, thing, or object by which the structure, thing, or object has a plurality of stacked or sandwiched sections. A layered structure does not imply any particular method of manufacture.

As used herein the term "section" refers to a portion of a composite that may include on or more individual layers.

As used herein, the terms "micro-milling" and "micro-milled" refers to a process and a product of a process, respectively. Milling, generally, is a subtractive manufacturing process that uses rotating cutting tools to remove material from a starting stock piece, commonly referred to as the workpiece. Micromilling is a fabrication method that creates microscale features via cutting tools that remove bulk material.

It is to be understood that this disclosure is not limited to particular embodiments described, as such may, of course, vary. It is also to be understood that the terminology used herein is for the purpose of describing particular embodiments only, and is not intended to be limiting, since the scope of the present disclosure will be limited only by the appended claims.

All numeric values are herein assumed to be modified by the term "about," whether or not explicitly indicated. The term "about" generally refers to a range of numbers that one of skill in the art would consider equivalent to the recited value (i.e., having the same function or result). In many instances, the term "about" may include numbers that are rounded to the nearest significant figure.

Where a range of values is provided, it is understood that each intervening value, to the tenth of the unit of the lower limit (unless the context clearly dictates otherwise), between the upper and lower limit of that range, and any other stated or intervening value in that stated range, is encompassed within the disclosure. The upper and lower limits of these smaller ranges may independently be included in the smaller ranges and are also encompassed within the disclosure, subject to any specifically excluded limit in the stated range. Where the stated range includes one or both of the limits, ranges excluding either or both of those included limits are also included in the disclosure.

All publications and patents cited in this specification are herein incorporated by reference as if each individual publication or patent were specifically and individually indicated to be incorporated by reference and are incorporated herein by reference to disclose and describe the methods and/or materials in connection with which the publications are cited. The citation of any publication is for its disclosure prior to the filing date and should not be construed as an admission that the present disclosure is not entitled to antedate such publication by prior disclosure. Further, the dates of publication provided could be different from the actual publication dates that may need to be independently confirmed.

It must be noted that, as used in the specification and the appended claims, the singular forms "a," "an," and "the" include plural referents unless the context clearly dictates otherwise. Thus, for example, reference to "a support" includes a plurality of supports. In this specification and in the claims that follow, reference will be made to a number of terms that shall be defined to have the following meanings unless a contrary intention is apparent.

All the features disclosed in this specification (including any accompanying claims, abstract, and drawings) may be replaced by alternative features serving the same, equivalent or similar purpose, unless expressly stated otherwise. Thus, unless expressly stated otherwise, each feature disclosed is one example only of a generic series of equivalent or similar features.

The examples and embodiments described herein are for illustrative purposes only and that various modifications or changes in light thereof will be suggested to persons skilled in the art and are to be included within the spirit and purview of this application. Many variations and modifications may be made to the above-described embodiment(s) of the disclosure without departing substantially from the spirit and principles of the disclosure. All such modifications and variations are intended to be included herein within the scope of this disclosure.

General Discussion

There is a pressing need for a treatment that can both prevent burn-induced scarring and provide ease of use in the field, particularly in environments, such as a battlefield, where burn care is challenging. In view of these needs, and with the knowledge of the characteristics of pirfenidone, various embodiments provide a composite structure adapted to administer pirfenidone to burn patients and to treat/prevent hypertrophic scarring. In accordance with same, various embodiments provide a composite structure for administration of pirfenidone to burn injuries, having superior controlled release and dermal penetration properties.

Various embodiments deliver pirfenidone (Pf), an anti-inflammatory and antifibrotic agent indicated for the treatment of idiopathic pulmonary fibrosis, for a new indication. The new indication being the prophylaxis of burn-induced hypertrophic scarring. Various embodiments provide formulations of Pf in various topical dosage forms. Various embodiments may be used as a prophylactic treatment for deep partial-thickness (DPT) and full-thickness (FT) burn wounds. Studies of various embodiments have showed that Pf reduced the key inflammatory cytokines IL-1β, IL-2, IL-6, IL-13, G-CSF, and MIP-1α; decreased neutrophil infiltration in mouse DPT wounds; inhibited human dermal fibroblasts (HDF) transdifferentiation to myofibroblasts; weakened the contractile machinery of activated dermal myofibroblasts; decreased collagen deposition and fibrosis-related gene expression; and reduced p38 MAPK activation in TGF-β1 stimulated HDF.

The provision of a prophylactic treatment against hypertrophic scarring for DPT and FT burn wounds according to various embodiments is particularly valuable, because it is difficult to predict which burn wounds will form hypertrophic scarring. Most partial-thickness burns are not grafted. A large percentage of DPT-burn wounds will form hypertrophic scars resulting in scar contracture and loss of function, but exactly which ones is difficult to predict. Once a hypertrophic scar is formed, available treatments are only minimally effective. An incidence of hypertrophic scarring at a rate of about 80% has been documented in military personnel following a burn injury.

In addition to preventative or prophylactic treatment against hypertrophic scarring, various embodiments may be used for surgical wound scar prevention, scar management, and also as anti-inflammatory dressings or treatments.

Layered Composite for Scar Treatment

Figure 1A:
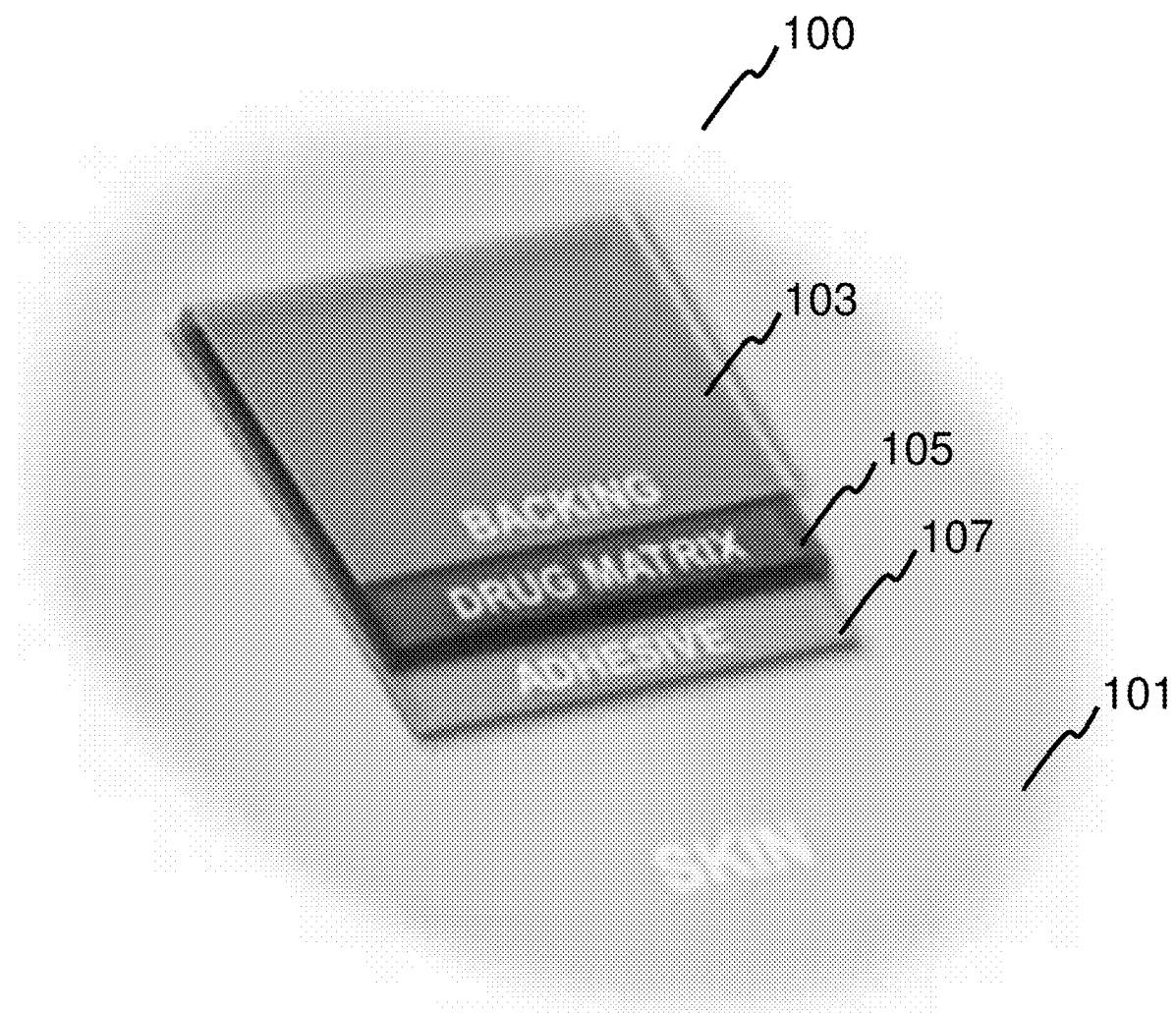
FIG. 1A is an example according to various embodiments illustrating a partial perspective view of a layered composite for scar treatment and prevention in relation to each other and to the patient's skin.

Various embodiments relate to a layered composite for scar treatment and prevention. FIG. 1A is an example according to various embodiments illustrating a partial perspective view of a layered composite 100 for scar treatment and prevention in relation to each other and to the patient's skin 101.

The layered composite 100 for scar treatment and prevention may be, for example, a layered pirfenidone-containing composite. The composite 100 may include a backing section 103, a drug matrix section 105, and a skin interfacing section 107. Each section may, itself, one or more layers. For clarity, each section is described individually. All combinations, variations, and permutations of the individually-described sections are contemplated and are hereby disclosed.

Backing Section

According to various embodiments, the backing section may include a permeable material. The permeable material may be permeable by moisture and/or by gas. According to various embodiments, the backing section may have a thickness of from about 10 to about 100 μm. Each range described herein is intended to include all numerical values encompassed by the range. Furthermore, additional ranges may be formed from any lower limits and/or upper limits described herein. For example, the backing section may have a thickness within a range having a lower limit and/or an upper limit. The range may include or exclude the lower limit and/or the upper limit. By way of example and not limitation, a lower limit and/or an upper limit may be selected from 5, 10, 15, 20, 25, 30, 35, 40, 45, 50, 55, 60, 65, 70, 75, 80, 85, 90, 95, 100, 105, 110, 115, 120, 125, 130, 135, 140, 145 and 150 μm. A range formed from a single lower limit includes at least the lower limit and all numerical values greater than the lower limit regardless of whether the values are explicitly recited in this disclosure. A range formed from a single upper limit includes at least the upper limit and all numerical values less than the upper limit regardless of whether the values are explicitly recited in this disclosure. A range formed from a combination of a lower limit and an upper limit includes at least the lower limit, the upper limit, and all numerical values therebetween regardless of whether the values are explicitly recited in this disclosure. For example, based on the set of exemplary upper limits and lower limits explicitly recited above, the backing section may have a thickness of: about 5 to about 150 μm, less than about 5 μm, greater than about 5 μm, less than about 150 μm, or greater than about 150 μm, etc. All such ranges are contemplated and are intended to be explicitly disclosed and recited. Each value recited is intended to be modified by the term "about." According to various other embodiments, the backing section may have a thickness of from about 10 to about 50 μm or from about 10 to about 20 μm.

Drug Matrix Section

The drug matrix section may be positioned adjacent to and in communication with the backing section.

According to various embodiments, the drug matrix section may include pirfenidone in an amount of from about 1 to about 20 mg/cm$^2$. Each range described herein is intended to include all numerical values encompassed by the range. Furthermore, additional ranges may be formed from any lower limits and/or upper limits described herein. For example, the drug matrix section may include pirfenidone in an amount within a range having a lower limit and/or an upper limit. The range may include or exclude the lower limit and/or the upper limit. By way of example and not limitation, a lower limit and/or an upper limit may be selected from 1, 2, 3, 4, 5, 6, 7, 8, 9, 10, 11, 12, 13, 14, 15, 16, 17, 18, 19, 20, 21, 22, 23, 24, 25, 26, 27, 28, 29, 30, 35, 40, 45, 50, 60, 70, 80, 90 and 100 mg/cm$^2$. A range formed from a single lower limit includes at least the lower limit and all numerical values greater than the lower limit regardless of whether the values are explicitly recited in this disclosure. A range formed from a single upper limit includes at least the upper limit and all numerical values less than the upper limit regardless of whether the values are explicitly recited in this disclosure. A range formed from a combination of a lower limit and an upper limit includes at least the lower limit, the upper limit, and all numerical values therebetween regardless of whether the values are explicitly recited in this disclosure. For example, based on the set of exemplary upper limits and lower limits explicitly recited above, the drug matrix section may include pirfenidone in an amount of: about 1 to about 100 mg/cm$^2$, less than about 1 mg/cm$^2$, greater than about 1 mg/cm$^2$, less than about 100 mg/cm$^2$, or greater than about 100 mg/cm$^2$, etc. All such ranges are contemplated and are intended to be explicitly disclosed and recited. Each value recited is intended to be modified by the term "about." According to various embodiments, the drug matrix section may include pirfenidone in an amount of from about 2 to about 15 mg/cm² or in an amount of from about 5 to about 10 mg/cm².

The drug matrix section may further include a controlled release matrix base material. According to various embodiments, the drug matrix section may include the controlled-release matrix base material in an amount of from about 20 to about 80 percent by weight based on the total weight of the drug matrix section. Each range described herein is intended to include all numerical values encompassed by the range. Furthermore, additional ranges may be formed from any lower limits and/or upper limits described herein. For example, the drug matrix section may include the controlled-release matrix base material in an amount within a range having a lower limit and/or an upper limit. The range may include or exclude the lower limit and/or the upper limit. By way of example and not limitation, a lower limit and/or an upper limit may be selected from 10, 15, 20, 25, 30, 35, 40, 45, 50, 55, 60, 65, 70, 75, 80, 85, 90 and 95 percent by weight based on the total weight of the drug matrix section. A range formed from a single lower limit includes at least the lower limit and all numerical values greater than the lower limit regardless of whether the values are explicitly recited in this disclosure. A range formed from a single upper limit includes at least the upper limit and all numerical values less than the upper limit regardless of whether the values are explicitly recited in this disclosure. A range formed from a combination of a lower limit and an upper limit includes at least the lower limit, the upper limit, and all numerical values therebetween regardless of whether the values are explicitly recited in this disclosure. For example, based on the set of exemplary upper limits and lower limits explicitly recited above, the drug matrix section may include the controlled-release matrix base material in an amount of: about 10 to about 95 percent by weight based on the total weight of the drug matrix section, less than about 10 percent by weight based on the total weight of the drug matrix section, greater than about 10 percent by weight based on the total weight of the drug matrix section, less than about 95 percent by weight based on the total weight of the drug matrix section, or greater than about 95 percent by weight based on the total weight of the drug matrix section, etc. All such ranges are contemplated and are intended to be explicitly disclosed and recited. Each value recited is intended to be modified by the term "about."

The controlled-release matrix base material may include one or more of an acrylate (also known as an acrylic or a polyacrylate), a cellulose, a polyurethane, a silicone, a polyisobutylene, and combinations thereof.

The drug matrix section may further comprise one or more encapsulating agents. The encapsulating agent(s) may encapsulate the drug to achieve sustained release over time. According to various embodiments, the encapsulating agent(s) may be selected from of poly(lactic-coglycolic acid) (PLGA), cyclodextrin, albumin, alginate, or chitosan. The drug matrix section may further comprise acrylic pressure-sensitive adhesive (PSA). Various embodiments may take the form of a variety of encapsulated products, such as microparticles, microspheres, microcapsules. Such encapsulated products may be prepared by many different methods, such as spray drying, double-emulsification, or milling, etc. Generally, the layered composites according to various embodiments showed a 70-80% release after 48 hours. The thickness of the skin-attaching layer (the silicone layer) may also control the release with the thicker the layer the slower the release of the drug. The encapsulating agents may be used in place of or in addition to the acrylic matrix described in the layered composites to improve the release. Such embodiments may provide sustained release of the drug of up to a week or beyond. The acrylic matrix, may be preferable, because it is more economical and easy to prepare.

According to various embodiments, the drug matrix section may further include a penetration enhancer. The penetration enhancer may be present in an amount of from about 1 to about 30 percent by weight based on the total weight of the drug matrix section. Each range described herein is intended to include all numerical values encompassed by the range. Furthermore, additional ranges may be formed from any lower limits and/or upper limits described herein. For example, the drug matrix section may further include a penetration enhancer. The penetration enhancer may be present in an amount within a range having a lower limit and/or an upper limit. The range may include or exclude the lower limit and/or the upper limit. By way of example and not limitation, a lower limit and/or an upper limit may be selected from 1, 2, 3, 4, 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39 and 40 percent by weight based on the total weight of the drug matrix section. A range formed from a single lower limit includes at least the lower limit and all numerical values greater than the lower limit regardless of whether the values are explicitly recited in this disclosure. A range formed from a single upper limit includes at least the upper limit and all numerical values less than the upper limit regardless of whether the values are explicitly recited in this disclosure. A range formed from a combination of a lower limit and an upper limit includes at least the lower limit, the upper limit, and all numerical values therebetween regardless of whether the values are explicitly recited in this disclosure. For example, based on the set of exemplary upper limits and lower limits explicitly recited above, the drug matrix section may further include a penetration enhancer. The penetration enhancer may be present in an amount of: about 1 to about 40 percent by weight based on the total weight of the drug matrix section, less than about 1 percent by weight based on the total weight of the drug matrix section, greater than about 1 percent by weight based on the total weight of the drug matrix section, less than about 40 percent by weight based on the total weight of the drug matrix section, or greater than about 40 percent by weight based on the total weight of the drug matrix section, etc. All such ranges are contemplated and are intended to be explicitly disclosed and recited. Each value recited is intended to be modified by the term "about." According to various embodiments, the drug matrix section may include the penetration enhancer in an amount of from about 5 to about 20 weight percent based on the total weight percent of the drug matrix section or in an amount of from about 10 to about 20 weight percent based on the total weight of the drug matrix section.

The penetration enhancer may include one or more of cocoyl caprylocaprate, decyl oleate, dimethyl sulfoxide, oleyl alcohol, octyldodecanol, propylene glycol, isopropyl myristate, and triacetin.

The drug matrix section may be in the form of one or more of particles. The particles may include microparticles and/or nanoparticles. The microparticles and/or nanoparticles may be milled or micro-milled. The particles may have an average particle size of from about 100 nanometers to about 700 micrometers. In other words, according to various embodiments, the particles may have an average particle size of from about 0.1 to about 700 micrometers. Each range described herein is intended to include all numerical values encompassed by the range. Furthermore, additional ranges may be formed from any lower limits and/or upper limits described herein. For example, the particles may have an average particle size within a range having a lower limit and/or an upper limit. The range may include or exclude the lower limit and/or the upper limit. By way of example and not limitation, a lower limit and/or an upper limit may be selected from 0.1, 0.2, 0.3, 0.4, 0.5, 0.6, 0.7, 0.8, 0.9, 1, 2, 3, 4, 5, 10, 15, 20, 25, 30, 35, 40, 45, 50, 55, 60, 65, 70, 75, 80, 85, 90, 95, 100, 200, 300, 400, 500, 600, 700, 800, 900 and 1000 micrometers. A range formed from a single lower limit includes at least the lower limit and all numerical values greater than the lower limit regardless of whether the values are explicitly recited in this disclosure. A range formed from a single upper limit includes at least the upper limit and all numerical values less than the upper limit regardless of whether the values are explicitly recited in this disclosure. A range formed from a combination of a lower limit and an upper limit includes at least the lower limit, the upper limit, and all numerical values therebetween regardless of whether the values are explicitly recited in this disclosure. For example, based on the set of exemplary upper limits and lower limits explicitly recited above, the particles may have an average particle size of: about 0.1 to about 1000 micrometers, less than about 0.1 micrometers, greater than about 0.1 micrometers, less than about 1000 micrometers, or greater than about 1000 micrometers, etc. All such ranges are contemplated and are intended to be explicitly disclosed and recited. Each value recited is intended to be modified by the term "about." According to various embodiments, microparticles may have an average particle size in a range of from about 0.7 to about 700 micrometers in diameter. According to various embodiments, nanoparticles may have an average particle size of from about 100 to about 2,500 nm in diameter.

Skin-Interfacing Section

The skin-interfacing section may be positioned adjacent to and in communication with the drug matrix section. The skin interfacing section may include a wound safe adhesive. According to various embodiments, the wound safe adhesive may have a thickness of from about 100 to about 2,000 μm. Each range described herein is intended to include all numerical values encompassed by the range. Furthermore, additional ranges may be formed from any lower limits and/or upper limits described herein. For example, the wound safe adhesive may have a thickness within a range having a lower limit and/or an upper limit. The range may include or exclude the lower limit and/or the upper limit. By way of example and not limitation, a lower limit and/or an upper limit may be selected from 50, 100, 150, 200, 250, 300, 350, 400, 450, 500, 550, 600, 650, 700, 750, 800, 850, 900, 950, 1000, 1050, 1100, 1150, 1200, 1250, 1300, 1350, 1400, 1450, 1500, 1550, 1600, 1650, 1700, 1750, 1800, 1850, 1900, 1950, 2000, 2050 and 2100 μm. A range formed from a single lower limit includes at least the lower limit and all numerical values greater than the lower limit regardless of whether the values are explicitly recited in this disclosure. A range formed from a single upper limit includes at least the upper limit and all numerical values less than the upper limit regardless of whether the values are explicitly recited in this disclosure. A range formed from a combination of a lower limit and an upper limit includes at least the lower limit, the upper limit, and all numerical values therebetween regardless of whether the values are explicitly recited in this disclosure. For example, based on the set of exemplary upper limits and lower limits explicitly recited above, the wound safe adhesive may have a thickness of: about 50 to about 2100 μm, less than about 50 μm, greater than about 50 μm, less than about 2100 μm, or greater than about 2100 μm, etc. All such ranges are contemplated and are intended to be explicitly disclosed and recited. Each value recited is intended to be modified by the term "about." According to various embodiments, the wound safe adhesive may have a thickness of from about 100 to about 200 μm or from about 100 to about 150 μm. According to various embodiments, a preferred thickness for the wound safe adhesive may be about 500 to about 600 μm.

The skin interfacing section may include a releasable liner. According to various embodiments, the releasable liner may have a thickness of from about 25 to about 150 μm. Each range described herein is intended to include all numerical values encompassed by the range. Furthermore, additional ranges may be formed from any lower limits and/or upper limits described herein. For example, the releasable liner may have a thickness within a range having a lower limit and/or an upper limit. The range may include or exclude the lower limit and/or the upper limit. By way of example and not limitation, a lower limit and/or an upper limit may be selected from 10, 15, 20, 25, 30, 35, 40, 45, 50, 55, 60, 65, 70, 75, 80, 85, 90, 95, 100, 105, 110, 115, 120, 125, 130, 135, 140, 145, 150, 155, 160, 165, 170, 175, 180, 185, 190, 195 and 200 μm. A range formed from a single lower limit includes at least the lower limit and all numerical values greater than the lower limit regardless of whether the values are explicitly recited in this disclosure. A range formed from a single upper limit includes at least the upper limit and all numerical values less than the upper limit regardless of whether the values are explicitly recited in this disclosure. A range formed from a combination of a lower limit and an upper limit includes at least the lower limit, the upper limit, and all numerical values therebetween regardless of whether the values are explicitly recited in this disclosure. For example, based on the set of exemplary upper limits and lower limits explicitly recited above, the releasable liner may have a thickness of: about 10 to about 200 μm, less than about 10 μm, greater than about 10 μm, less than about 200 μm, or greater than about 200 μm, etc. All such ranges are contemplated and are intended to be explicitly disclosed and recited. Each value recited is intended to be modified by the term "about."

Methods for Producing Layered Composites

The layered composites may be prepared by any suitable method. According to various embodiments, each layer of the layered composite may be laminated by a physical lamination process. According to other embodiments, layer-by-layer casting may be employed to form the layered composite. A layer-by-layer casting process is generally superior to lamination of layers. In this regard, it has been unexpectedly discovered that lamination resulted de-lamination of the skin-attaching layer (the silicone layer). The delamination of the drug matrix layer from the silicone layer would diminish proper drug delivery to wounds.

Layer-by-layer fabrication is the process of casting and drying/curing layers directly over underlying layers. This is in contrast with the lamination process which involves casting layers separately and combining them after they have individually dried/cured. For the fabrication of the multi-layered patch, a solvent-based solution of polyurethane backing material is cast over a liner. After the backing layer solvent is removed, the solvent-based drug matrix is cast directly over the dried backing. After the drug matrix layer solvent is removed, the silicone adhesive is cast directly over the dried drug matrix and allowed to cure.

Lastly, the patch is removed from the original backing and placed on a final carrier that covers the silicone adhesive.

Figure 1B:
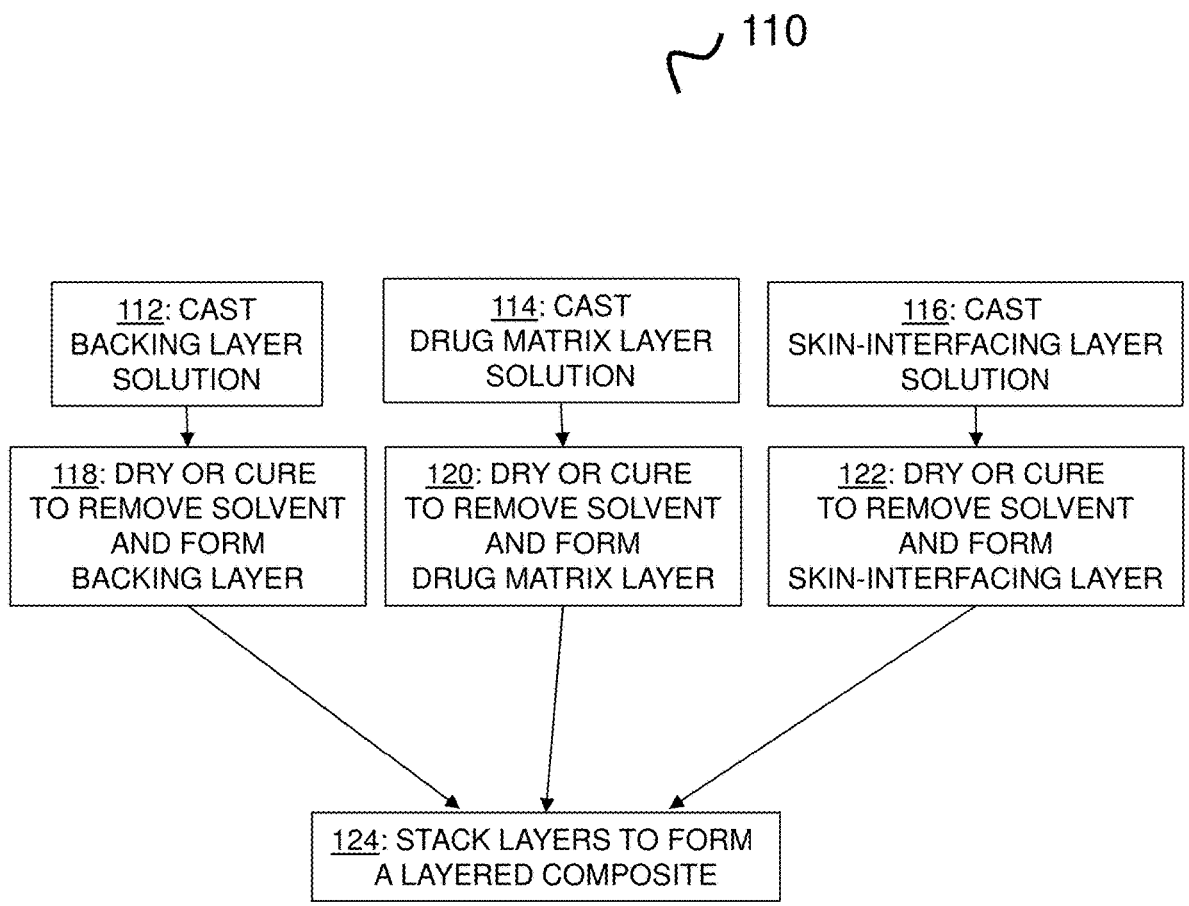
FIG. 1B is an example according to various embodiments illustrating a flow chart for a method for producing a layered composite via a lamination technique.

FIG. 1B is an example according to various embodiments illustrating a flow chart for a method 110 for producing a layered composite comprising a backing layer, a drug matrix layer, and a skin-interfacing layer via a lamination technique. At step 112, a backing layer solution may be cast and then dried or cured to remove a solvent and to form a backing layer at step 118. At step 114, a drug matrix layer solution may be cast and then dried or cured to remove solvent and to form a drug matrix layer at step 120. At step 116, a skin-interfacing layer solution may be cast and then dried or cured to remove solvent and to form a skin-interfacing at step 122. Obviously, step 118 must follow step 112; step 120 must follow step 114; and step 122 must follow step 116, but otherwise these steps may proceed in any order. The casting steps 112, 114, and 116 may include pouring a solution comprising a solvent and the components of each layer into a mold or a form and/or onto a liner. The drying/curing steps 118, 120, and 122 may include heating the cast layer to remove the solvent. Method 110 may also optionally include preparing or otherwise obtaining the back layer solution, the drug matrix layer solution, and/or the skin-interfacing layer solution.

Figure 1C:
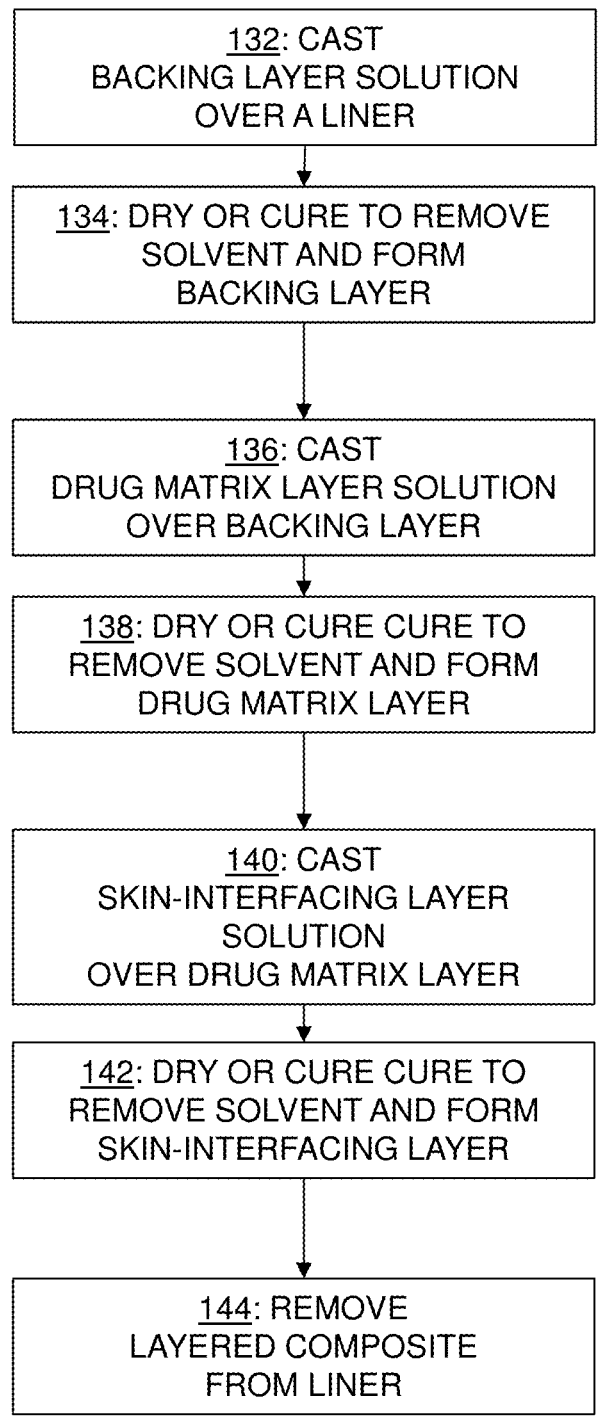
FIG. 1C is an example according to various embodiments illustrating a flow chart for a method for producing a layered composite via a layer-by-layer casting technique.

FIG. 1C is an example according to various embodiments illustrating a flow chart for a method 130 for producing a layered composite comprising a backing layer, a drug matrix layer, and a skin-interfacing layer via a layer-by-layer casting technique. At step 132 a backing layer solution comprising components for the backing layer and a solvent may be cast into a mold or a form and/or onto a liner. At step 134, the backing layer solution may be cured or dried to remove the solvent and to form the backing layer. At step 136 a drug matrix layer solution comprising components for the drug matrix layer and a solvent may be cast onto the backing layer, which may optionally remain in a mold or a form. At step 138, the drug matrix layer solution may be cured or dried to remove the solvent and to form the drug matrix layer disposed on the backing layer. At step 140 a skin-interfacing layer solution comprising components for the skin-interfacing layer and a solvent may be cast onto the drug matrix layer, which may optionally remain in a mold or a form on top of the backing layer. At step 142, the skin-interfacing layer solution may be cured or dried to remove the solvent and to form the skin-interfacing layer disposed on the drug matrix layer, which is in turn disposed on the backing layer. Finally, at step 144, the layered composite comprising the backing layer, the drug matrix layer, and the skin-interfacing layer may be removed from the liner and/or from any mold or form that was used during casting.

EXAMPLES

Introduction

The following examples are put forth to provide those of ordinary skill in the art with a complete disclosure and description of how to perform the methods, how to make, and how to use the compositions and compounds disclosed and claimed herein. Efforts have been made to ensure accuracy with respect to numbers (e.g., amounts, temperature, etc.), but some errors and deviations should be accounted for.

The purpose of the following examples is not to limit the scope of the various embodiments, but merely to provide examples illustrating specific embodiments.

Example 1

Figure 2A:
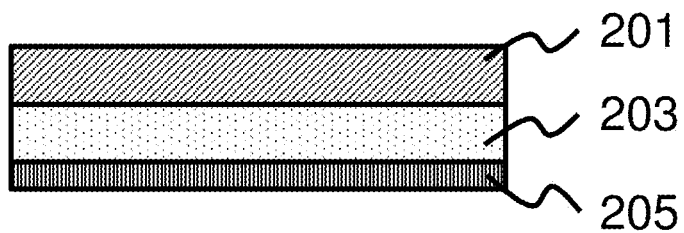
FIG. 2A is an example according to various embodiments illustrating a layered composite dressing, having three sections.

FIG. 2A is an example according to various embodiments illustrating a layered composite dressing 202, having three sections. The three sections include a backing section 201, a drug matrix section 203, and a skin-interfacing section 205. The backing section 201 comprised a layer of thermoplastic polyurethane (TPU), specifically PY-PT72AE, Lubrizol, having a thickness of about 120 μm. The drug matrix section 203 comprised a controlled-release matrix base material, specifically an acrylate polymer (DURO-TAK 87-2852, Henkel), and pirfenidone. The drug loading for large layered composites with a 1000 μm drug matrix casting height (theoretical dry thickness of ~335 um) was 3.38±0.23 mg/cm$^2$ (n=6 films, n=9 technical repeats/film). The drug matrix section 203 had a thickness of about 200 μm. The skin-interfacing section 205 comprised a silicone adhesive, specifically MG7-9850 from Dow Corning, and had a thickness of about 200 μm.

The PY-PT72AE thermoplastic polyurethane (TPU) was selected as a backing material because it was able to provide better transparent and elastic properties than alternative backing material categories such as polyethylene or polyethylene/aluminum based backings. PY-PT72AE was specifically selected among other polyurethanes because it produces optically transparent films allowing visualization of the wound after application of the patch. Additionally, the material is highly elastic—more so than other screened polyurethane materials—allowing it to conform to contours of various anatomical forms of our body. The PY-PT72AE is a pharmaceutical grade TPU produced under GMP guidelines with a history of biocompatibility, safety, and stability.

DURO-TAK 87-2852 is an acrylate co-polymer adhesive that was selected as a drug matrix because it had a high maximum loading capacity for Pirfenidone (>15 wt %) and provided controlled release properties (2-3 extended release) to the patch. These properties were not achievable with other materials tested such as water-based polymers (e.g. methyl cellulose), silicones, and biodegradable polymers (e.g. poly (lactic-co-glycolic acid). DURO-TAK 87-2852 is relatively stable and does not result in degradation and patch opacity when exposed to water that was observed with the inclusion of poly(lactic-co-glycolic acid). DuT 87-2852 produces optically transparent films with high flexibility, similarly to the backing layer material. DURO-TAK products are produced under GMP guidelines with a significant history of use on skin.

MG7-9850 soft skin adhesive is a two-part platinum catalyzed silicone adhesive. This material was added below the DURO-TAK drug matrix as a skin-contacting layer because MG7-9850 is marketed for wound care application. MG7-9850 provides low peel release force from skin and does not negatively impact the release of Pirfenidone from the overlying drug matrix layer. MG7-9850 is also marketed as non-sensitizing, non-irritating, and non-cytotoxic. The product is manufactured in compliance with ISO 9001:2000 Standards.

The layered composite dressing 202 was applied to skin in an orientation that disposed the skin-interfacing section 205 against the skin.

Example 2

Figure 2B:
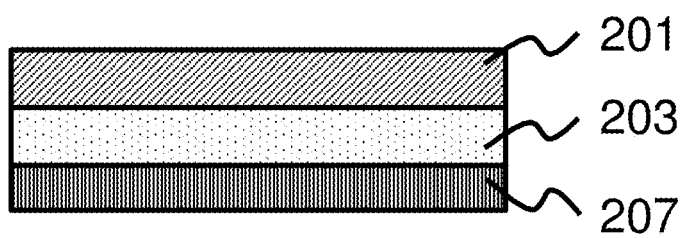
FIG. 2B is an example according to various embodiments illustrating a layered composite dressing, having three sections, differing from the layered composite dressing illustrated in FIG. 2A in that the skin-interfacing section is thicker.

FIG. 2B is an example according to various embodiments illustrating a layered composite dressing 204, having three sections, differing from the layered composite dressing illustrated in FIG. 2A in that the skin-interfacing section 207 was thicker than the skin-interfacing section 205. The three sections include a backing section 201, a drug matrix section 203, and a skin-interfacing section 207. The backing section 201 and the drug matrix section 203 were as described in Example 1. The skin-interfacing section 207 comprised a silicone adhesive, having the same composition as that described in Example 1, but with a thickness of about 400 μm. The layered composite dressing 204 was applied to skin in an orientation that disposed the skin-interfacing section 207 against the skin.

Example 3

Figure 2C:
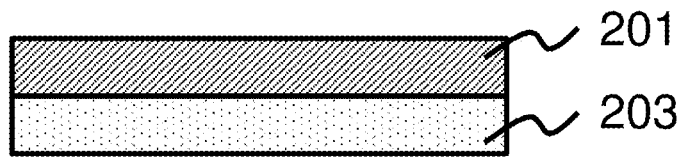
FIG. 2C is an example according to various embodiments illustrating a layered composite dressing, having two sections, not including a skin-interfacing section.

FIG. 2C is an example according to various embodiments illustrating a layered composite dressing, having two sections, not including a skin-interfacing section. The two sections included a backing section 201 and a drug matrix section 203. The backing section 201 and the drug matrix section 203 were as described in Examples 1 and 2. No skin-interfacing section was included. The layered composite dressing 206 was applied to skin in an orientation that disposed the drug matrix section 203 directly against the skin.

Results of Examples 1-3

Figure 3:
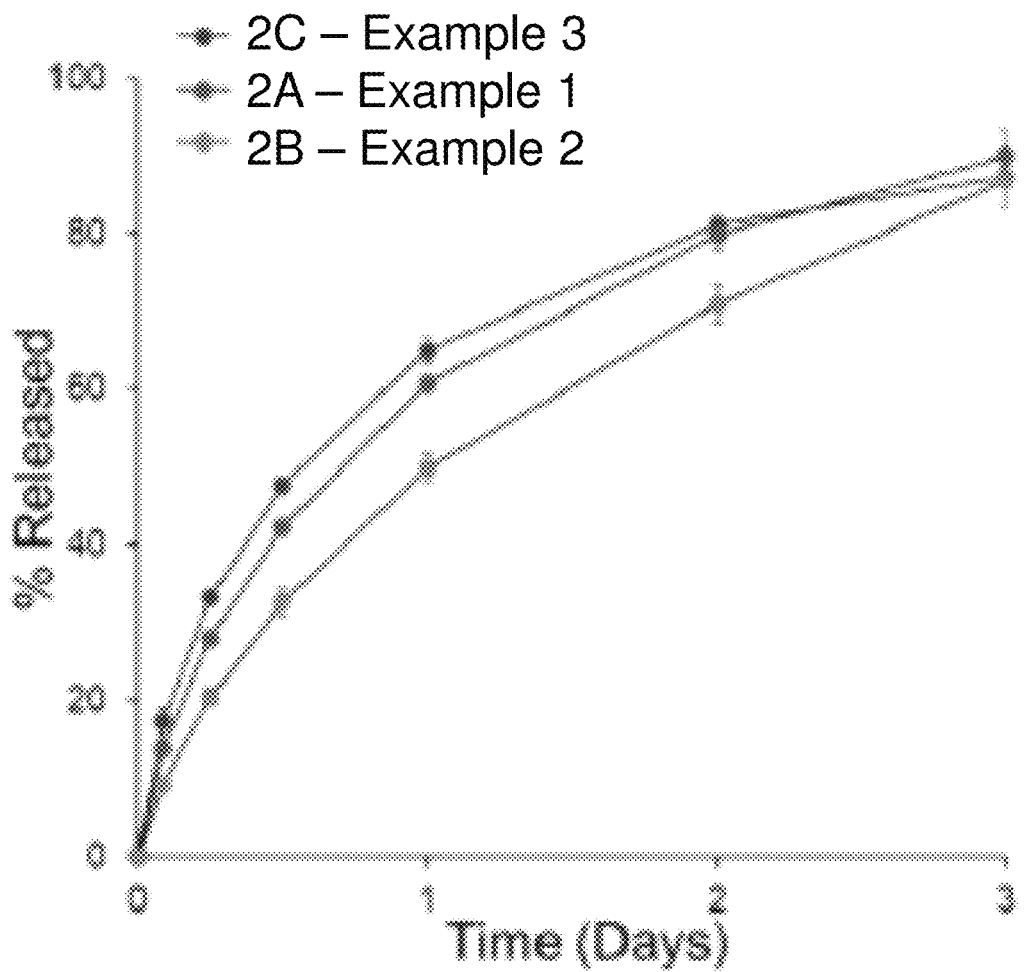
FIG. 3 is an example according to various embodiments illustrating a graph showing the kinetic release profile of the layered composite dressings prepared according to Examples 1-3.

FIG. 3 is an example according to various embodiments illustrating a graph showing the kinetic release profile of the layered composite dressings illustrated in FIGS. 2A, 2B, and 2C and prepared as described in Examples 1-3. Release kinetics was determined by in vitro release tests (IVRT) which were performed on a vertical diffusion cell (Vision® Microette™, Hanson, Chatsworth, CA, USA) with automated sampling. Diffusion cells had an effective diffusion area of 1.77 cm$^2$ and a donor chamber height of 1 mm. Donor chamber was separated from receptor chamber with a regenerated cellulose membrane of MWCO 12-14 kD. Receptor chamber was 6.7 mL in volume and filled with 1× phosphate-buffered saline (PBS) at pH 7.4 and maintained at 32° C. using a recirculating water bath. 500 μL samples were taken at different intervals which involved a 1 mL flush followed by a sampling event. Pf concentration in all samples was quantified by uHPLC. Percent release was determined by cumulative Pf recovered up to each test interval divided by the total Pf recovery over the study period. It was unexpectedly discovered that in comparison to the configuration shown in FIG. 2C, the configuration shown in FIG. 2A provided (1) comparable release of pirfenidone over two days, and (2) superior release of pirfenidone thereafter.

This unexpected result is highly advantageous because provision of the skin-interfacing section comprising silicone adhesive minimizes movement of the dressing over time, but also provides an easily removeable dressing. Minimizing movement of the dressing is particularly important when treating delicate and painful burn wounds. Ensuring low peel adhesion is also important when treating delicate and easily damaged burn wounds. Various embodiments, therefore, provide a stably adhered dressing that provides not only extended release of pirfenidone, but also improved release of pirfenidone over a period of about 72 hours. For example, various embodiments provide greater than about 75% release of pirfenidone over a period of about 48 to about 72 hours.

Example 4

A layered composite having the structure illustrated in FIG. 2A was prepared. The sections were the same as in Example 1 with the following exceptions: The backing section 201 had a thickness of about 1000 μm and the drug matrix section 203 had a thickness of about 600 μm. As in Example 1, the skin-interfacing section 205 had a thickness of about 200 μm. The layered composite dressing 202 was applied to skin in an orientation that disposed the skin-interfacing section 205 against the skin.

Example 5

A layered composite having the structure illustrated in FIG. 2B was prepared. The sections were the same as in Example 2 with the following exceptions: The backing section 201 had a thickness of about 1000 μm and the drug matrix section 203 had a thickness of about 600 μm. As in Example 2, the skin-interfacing section 207 had a thickness of about 400 μm. The layered composite dressing 204 was applied to skin in an orientation that disposed the skin-interfacing section 207 against the skin.

Example 6

A layered composite having the structure illustrated in FIG. 2C was prepared. The sections were the same as in Example 2 with the following exceptions: The backing section 201 had a thickness of about 1000 μm and the drug matrix section 203 had a thickness of about 600 μm. As in Example 3, no skin-interfacing section was included. The layered composite dressing 206 was applied to skin in an orientation that disposed the drug matrix section 203 directly against the skin.

Results of Examples 4-6

Figure 4:
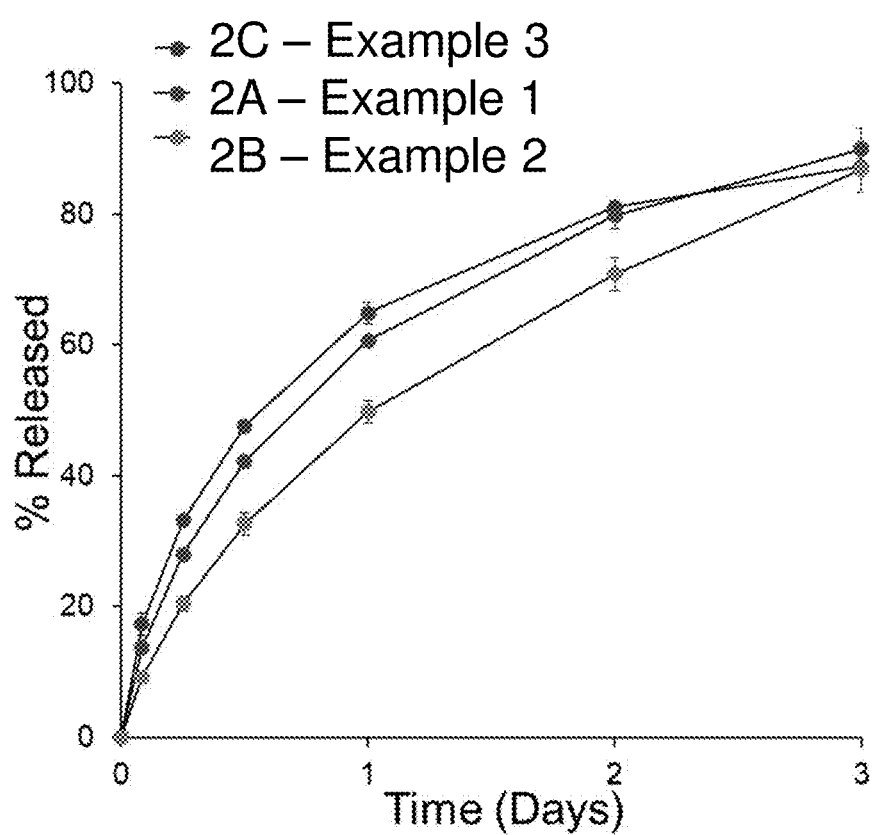
FIG. 4 is an example according to various embodiments illustrating a graph showing the kinetic release profile of the layered composite dressings prepared according to Examples 1-3.

FIG. 4 is an example according to various embodiments illustrating a graph showing the kinetic release profile of the layered composite dressings illustrated in FIGS. 2A, 2B, and 2C and prepared as described in Examples 4-6.

Example 7

A purpose of this example was to demonstrate Ex-vivo human skin permeation with Pirfenidone loaded patches and KitosCell gel.

In this ex-vivo skin permeation experiment, the permeation profiles of 2 differently loaded pirfenidone patches and KitosCell gel through full-thickness human skin over 72 h were evaluated (Niese-2020). Furthermore, the mass balance of the API (pirfenidone) was determined after 72 h.

The patches used consisted of a soft skin adhesive, an adhesive API layer containing 5% (w/w) or 15% (w/w) pirfenidone, and a backing film. The 5% and 15% pirfenidone in the adhesive layer refer to 2.15% and 6.46% in the whole patch, respectively (all 3 layers). To determine the extent of skin permeation by pirfenidone, both patches and KitosCell gel (8% pirfenidone) were applied to full-thickness human skin mounted onto Franz cells. The amount of gel per cell was adapted so that comparable absolute amounts of API were used as in the 15% pirfenidone patch (0.984 mg/0.82 cm$^2$). Samples from the permeation study were collected at 2, 4, 6, 8, 12, 18, 24, 36, 48, 60, and 72 h from the receptor chambers of the Franz cells for the determination of drug permeation profiles. After completion of the permeation experiment, the human skin samples and the patches were extracted with methanol to determine the extent of penetration/deposition of pirfenidone in the skin after 72 h.

Figure 5:
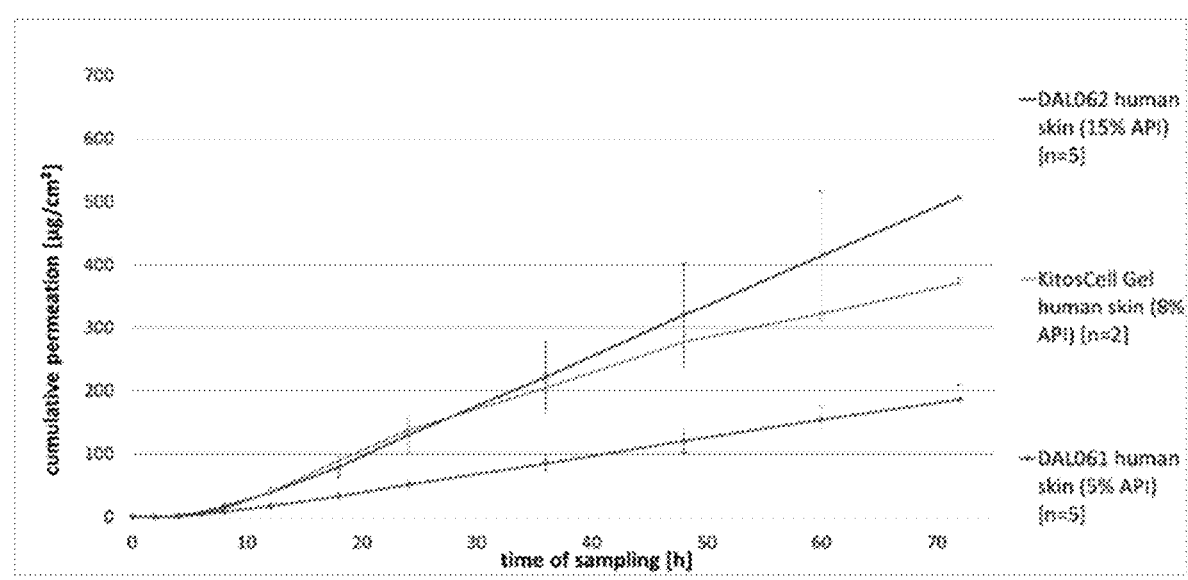
FIG. 5 is an example according to various embodiments illustrating the cumulative permeation profile (mean±SD) obtained in Example 7.

The cumulative permeation of pirfenidone versus time, as depicted in FIG. 5 shows that both the pirfenidone-containing patches and the gel have an initial lag time of 6 h, which is required for the drug molecules to equilibrate with the skin. After this initial lag time, the patches show a constant release over the run time of 72 h. In contrast, the gel starts initially with a comparable release profile as the patch containing 15% pirfenidone; however, the drug release rate starts declining after 36 hours. Both patches (with different pirfenidone concentrations) show a constant release but vary in the absolute cumulative permeation (nearly concentration-proportional) as well as the flux rate (data not shown).

FIG. 5 is an example according to various embodiments illustrating the cumulative permeation profile (mean±SD) obtained in Example 7. More specifically, FIG. 5 shows cumulative pirfenidone permeation profile for 5% (blue) and 15% (red) patch and KitosCell gel (green) on human full thickness skin. The human skin was exposed to the drug preparations for 72 hours in the Franz cell chamber. Number of samples displayed in the legend of the graph.

Example 8

A purpose of this example was to determine release profiles of Pf patches with or without PE. This example Drug matrix consists of 15 wt % Pf, 20 wt % PE and was cast with a 1500 μm wet thickness. (DMSO: dimethyl sulfoxide, IPM: isopropyl myristate, PG: propylene glycol, 3C: cocoyl caprylocaprate, DO: decyl oleate, OA: oleyl alcohol, OD: octyldodecanol).

Figure 7:
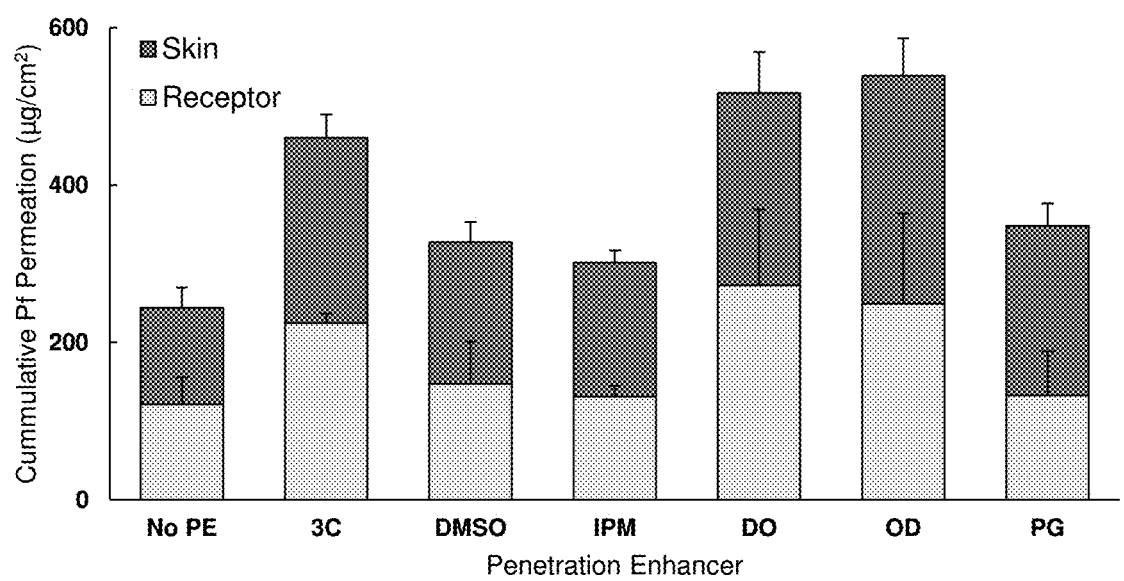

FIG. 7 is an example according to various embodiments illustrating 24 hour cumulative permeation of Pf from multilaminate patch without and with various penetration enhancers (PE) in full thickness, intact porcine skin. Drug matrix consists of 15 wt % Pf, 20 wt % PE and was cast with a 1500 um wet thickness. (DMSO: dimethyl sulfoxide, IPM: isopropyl myristate, PG: propylene glycol, 3C: cocoyl caprylocaprate, DO: decyl oleate, OA: oleyl alcohol, OD: octyldodecanol).

Example 9

In another embodiment, provided specific methods of fabricating a layer-by-layer Pirfenidone anti-scar patch. The composition of the backing layer, drug matrix layer and silicone adhesive are provided in Table 1 below.

TABLE 1

Composition of Layer-by-Layer Pirfenidone Anti-scar patch

| Layer | Solution Composition | Wt % | Standard Batch Recipe | Wet Gap Width |
|---|---|---|---|---|
| 1. Backing | Polyurethane (PY-PT72AE, Lubrizol ®) | 12.5% | 2.5 g of Polyurethane | 150 μm |
|  | Tetrahydrofuran | 87.5% | 17.5 g of Tetrahydrofuran |  |
| 2. Drug Matrix | Acrylic Adhesive (DuroTak 87-2852*, Henkel ®) Adjusted to 32 wt % solids content w/Ethyl Acetate | 95.4% | 20 g of DuroTak 87-2852 stock 0.94 g of Ethyl Acetate | 600 μm |
|  | Pirfenidone** | 4.6% | 1.0 g of Pirfenidone |  |
| 3. Silicone Adhesive | Silicone Adhesive Part A (MG7-9850, DuPont ®) | 50% | 7 g of MG7-9850 Part A | 400 μm |
|  | Silicone Adhesive Part B | 50% | 7 g of MG7-9850 Part B |  |

*DuroTak 87-2852 label shows 33.5 wt % solids content but can very depending on batch from supplier and age of stock
**Pirfenidone is added at 15 wt % drug loading relative to the solids content of the drug matrix compares the drug release profiles of a drug matrix having 15 wt % Pf with or without 20 wt % of a penetration enhancer (with a final casting height of 1500 um).

Pirfenidone multi-layered patches were produced at a laboratory scale. All layers were cast using a doctor blade caster with adjustable blade height. First, the backing layer was prepared by casting a solution of 12.5 wt % polyurethane (PY-PT72AE) in tetrahydrofuran (THF) solvent over a release liner at an application height of 150 μm. The layer was dried by allowing THF to evaporate for 30 minutes under ventilation. Next, a solvent-based solution of the acrylic drug matrix (DuT 87-2852), additionally composed of 15 wt % Pirenidone and 10 wt % oleyl alcohol (releasing agent/chemical penetration enhancer), was directly cast over the dried backing layer at an application height of 1000 μm. The drug matrix layer was dried overnight under ventilation. Finally, a two-part platinum-catalyzed silicone adhesive (MG 7-9850) was mixed using a dual asymmetric centrifuge for 2 minutes at 3000 RPM. The mixed silicone adhesive was cast directly over the dried drug matrix layer at an application height of 600 μm and allowed to cure at 50° C. for 20 minutes. The multi-layered patch was then removed from the original liner and placed silicone-side down over a fluorosilicone coated polyester liner (3™ Scotckpak™ 9709) that is compatible with silicone adhesives and can be easily removed.

Figure 6:
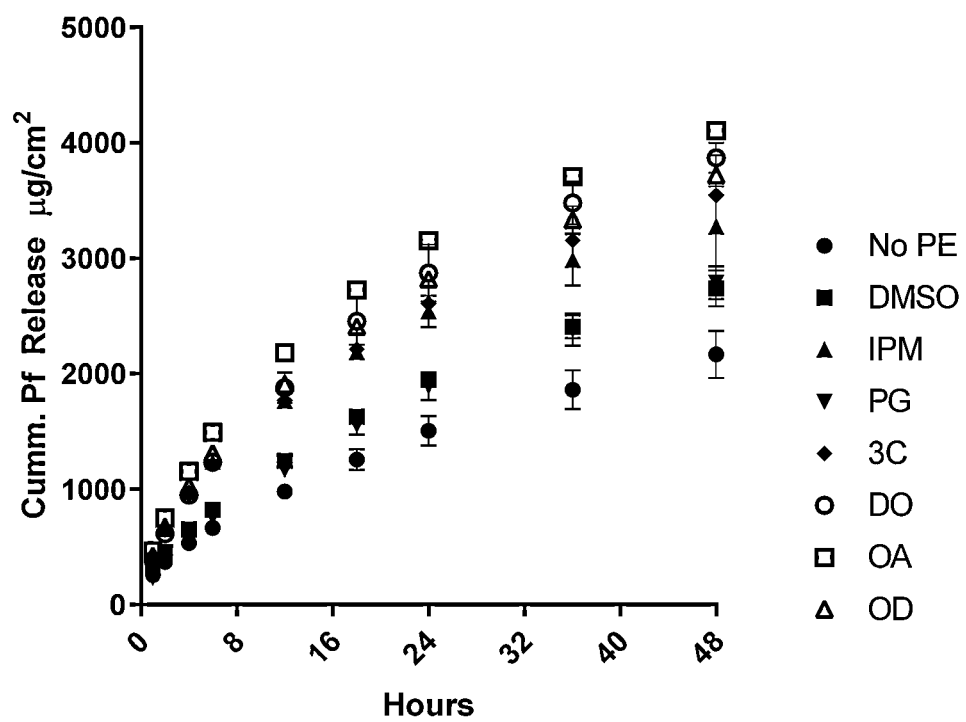
FIG. 6 is an example according to various embodiments illustrating cumulative release of Pf from multilaminate patch without and with various penetration enhancers (PE) according to Example 8.

FIG. 6 is an example according to various embodiments illustrating cumulative release of Pf from multilaminate patch without and with various penetration enhancers (PE).

Figure 8:
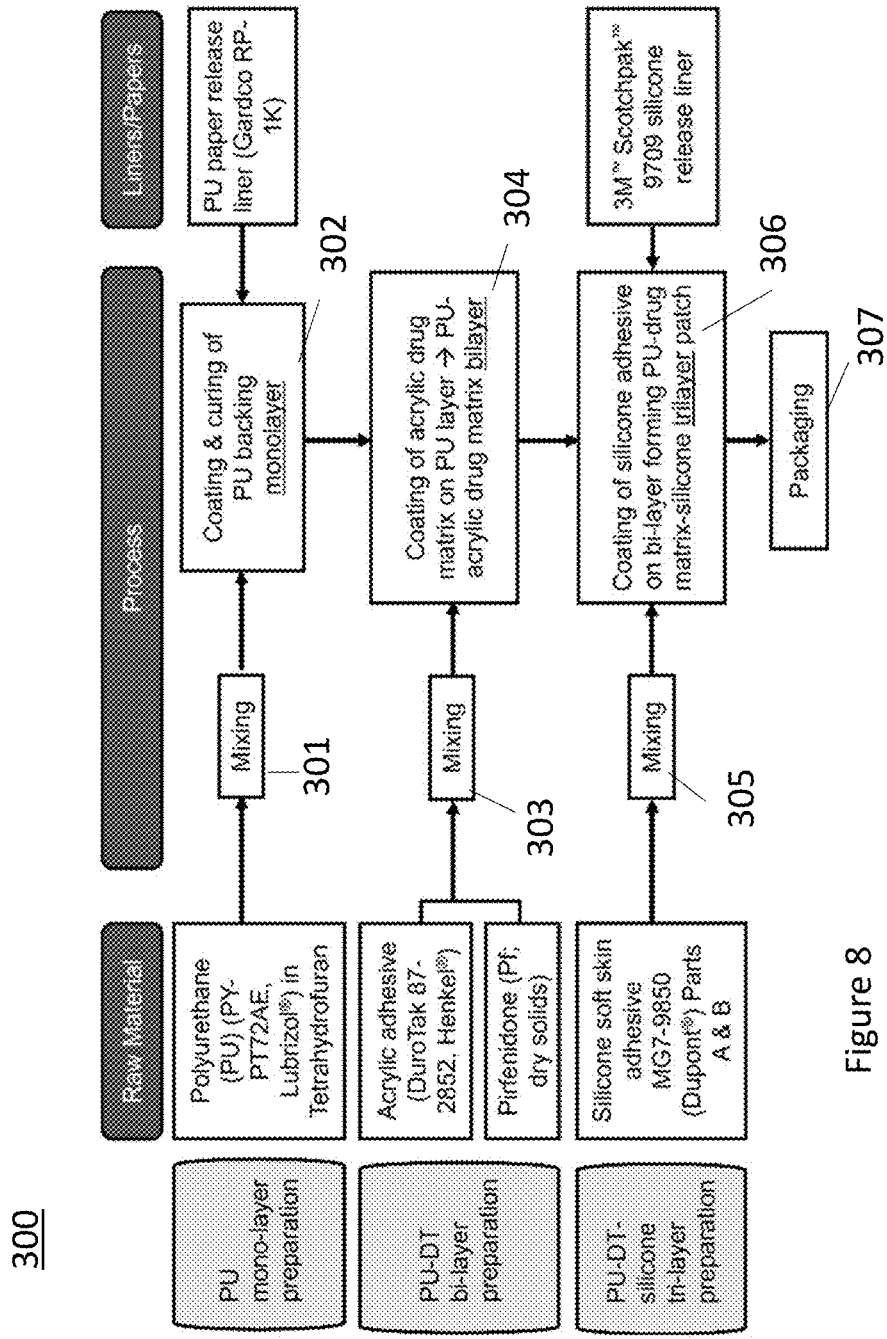

FIG. 8 provides a diagram illustrating the general fabrication process 300 related to the compositional layers set forth in Table 1. The backing layer of Table 1 is prepared by mixing polyurethan (PU) (e.g., PY-PT2AE Lubrizol®) in Tetrahydrofuran (step 301) which is then coated and cured on PU paper release liner (e.g., Gardco RP-1K) (step 302) to form a PU backing monolayer. The drug matrix layer of Table 1 is formed by mixing (step 303) the drug (e.g., Pirfenidone) with the acrylic adhesive (e.g., DuroTak 87-2852, Henkel®) and coating the mixture onto the PU backing monolayer (step 304) to form a PU acrylic drug matrix bilayer. The silicone adhesive layer of Table 1 is formed by mixing the silicone soft skin adhesive (e.g. MG7-9850, Dupont®) parts A & B (step 305). The silicone soft skin adhesive is then coated on the bi-layer of step 304 (step 306) to form the PU-drug matrix-silicone trilayer patch. Lastly, the trilayer patch can be packaged for distribution (step 307).

Figure 9:
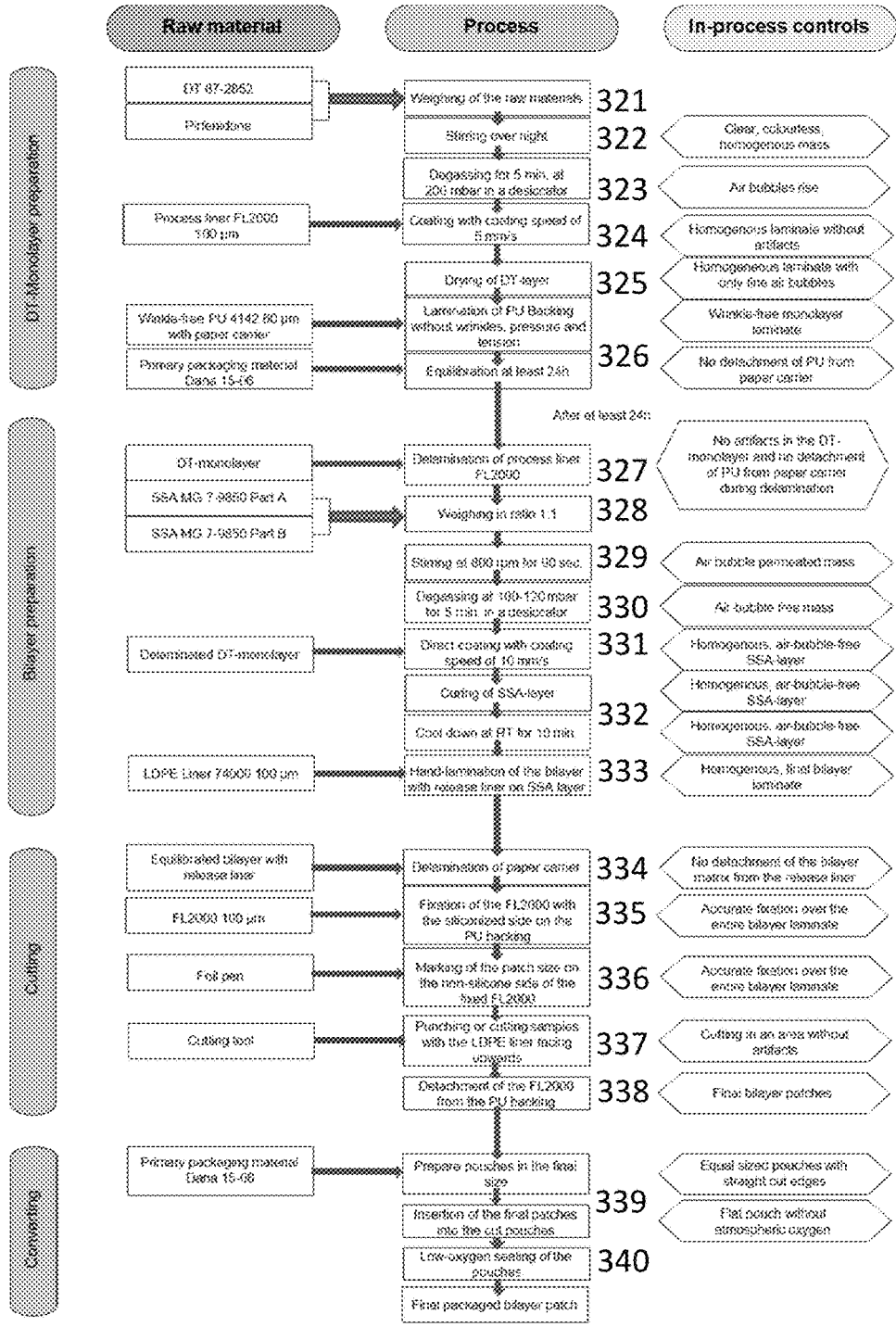

FIG. 9 illustrates another fabrication process 320, which is similar to the fabrication process 300 of FIG. 8 but modified for larger scale production. The notable difference between the fabrication process of FIG. 8 and FIG. 9 is that the process of FIG. 9 utilizes a preformed polyurethane (PU) backing layer (e.g. PU4142 with paper carrier) that avoids the need for the backing layer formation step of 302. As will be explained further below, fabrication process 320 is machine driven. First, a DT/drug-monolayer is formed by weighing the raw materials (DT 87-2852 and Pirfenidone) (step 321), stirring a mixture of the raw materials for at least 8 hours (step 322), degassing for 5 min at 200 mbar in a desiccator (step 323) and then coating the degassed mixture onto a process liner (e.g. FL2000, 100 microns) (step 324) to form a DT/drug-monolayer. The DT-layer is dried (step 325). A wrinkle-free, preformed PU backing layer (e.g. PU4142, 60 microns, with paper carrier) is laminated (step 326) with the DT/drug-monolayer by pressurized contact and equilibrated for at least 24 h. The DT/drug-monolayer is delaminated (step 327) to remove the process liner. SSA MG-7-9850 part A and SSA MG-7-9850 part B is weighed out at a ratio of 1:1 (step 328) and stirred (e.g. 800 rpm for 90 sec.) (step 329), and then degassed (e.g. 100-120 mbar for 5 min in a dessicator) (step 330) to form a SSA (silicone) mixture. The delaminated DT/drug-monolayer is coated with the SSA mixture (e.g. at speed of 10 mm/s) (step 331). The SSA mixture is cured and cooled (e.g. at room temperature for 10 min) (step 332) to form a bilayer (DT/drug-layer and SSA layer). The bilayer is laminated with release liner onto the SSA layer (step 333) to form an equilibrated bilayer with release liner (e.g. LDPE liner 74000 microns). The equilibrated bilayer with the release liner is delaminated of the paper carrier (step 334) and then a second process liner is fixed to the bilayer (step 335) with the siliconized side on the PU backing to replace the original paper carrier. Patch sizes are marked (step 336) on the non-silicone side of the fixed process liner using for example a foil pen. Patch samples are cut (step 337) using a cutting tool with the LDPE liner facing upwards. The second process liner is detached (step 338) from the PU backing of the patch samples to form final bilayer patches. The bilayer patches are then inserted into pouches (step 339) and the low oxygen sealed (step 340) to form final packaged bilayer patches.

Figure 10:
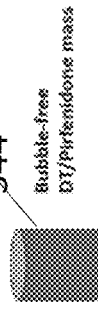

FIG. 10 shows a system 340 for conducting the fabrication process 320 of set forth in FIG. 9. The system 340 includes a spindle 341 upon which the process liner 342 is fed to a slot die or knife 343 through which the DT-drug mixture 344 is coated onto the process liner 342. The DT-drug coated process liner 345 is then fed through a multi-zone oven 346 for curing. The process liner with the DT-drug coating 345 is then laminated with the PU backing 347 fed from spindle 348 and through a laminator roll 349 with the resulting DT-drug/PU backing bilayer/process liner 350 wrapped on spindle 351. The DT-drug/PU backing bilayer/process liner 350 is equilibrated and then the process liner 342 is delaminated from the DT-drug/PU backing bilayer 361. The delaminated process liner 342 is wrapped on spindle 352 and the DT-drug/PU backing bilayer 361 is coated with SSA 353 via a slot die or knife 362 whereby the resulting DT-drug/PU/SSA combination 354 is fed through a multi-zone oven 355 (which may be the same as 342) for curing. The DT-drug/PU/SSA combination 354 is then laminated with a release liner 356 fed from spindle 357 that is pressed together via laminator roll 358 (which may be the same as laminator roll 349) with the resulting DT-drug/PU/SSA/release liner combination 359 wrapped around spindle 360.

What is claimed is:

1. A layered composite for scar treatment and prevention, the layered composite comprising:
    a backing section;
    a skin-interfacing section; and
    a drug matrix section that (i) is disposed between, and contacts both, the backing section and the skin-interfacing section and (ii) comprises pirfenidone in an amount consisting of from 1 to 2 mg/cm$^2$ in a controlled release matrix base material comprised of an acrylate polymer, wherein the layered composite provides greater than 75% release of the pirfenidone over a period of 48 to 72 hours.

2. The layered composite according to claim 1, wherein the backing section comprises a permeable material, wherein the permeable material is permeable to one selected from a group consisting of moisture, gas, and combinations thereof.

3. The layered composite according to claim 2, wherein the permeable material has a thickness of from 10 to 100 µm.

4. The layered composite according to claim 1, wherein the skin-interfacing section further comprises a releasable liner.

5. The layered composite according to claim 4, wherein the releasable liner has a thickness of from 25 to 150 µm.

6. The layered composite according to claim 1, wherein the drug matrix section further comprises one selected from a group consisting of poly(lacticco-glycolic acid) (PLGA), cyclodextrin, cellulose, albumin, alginate, chitosan, and combinations thereof.

7. The layered composite according to claim 1, wherein the drug matrix section further comprises an acrylic pressure-sensitive adhesive (PSA).

8. The layered composite according to claim 1, wherein the drug matrix section further comprises a penetration enhancer comprising one selected from a group consisting of cocoyl caprylocaprate, decyl oleate, dimethyl sulfoxide, oleyl alcohol, octyldodecanol, propylene glycol, isopropyl myristate, triacetin, and combinations thereof.

9. The layered composite according to claim 1, wherein the skin-interfacing section has a thickness of from 100 to 2,000 um.

10. A method for scar treatment and prevention comprising applying a layered composite to a burn wound, the layered composite comprising: a backing section, a drug matrix section, and a skin-interfacing section; wherein the drug matrix section is disposed between and contacts both the backing section and the skin-interfacing section; wherein the skin-interfacing section is disposed against the burn wound; and wherein the drug matrix section comprises pirfenidone in an amount consisting of from 1 to 2 mg/cm$^2$ in a controlled release matrix base material comprised of an acrylate polymer.

11. The method according to claim 10, wherein the skin-interfacing section further comprises a releasable liner; and wherein the method further comprises removing the layered composite from the burn wound.

* * * * *